US012680305B2

(12) United States Patent
Padwal et al.

(10) Patent No.: US 12,680,305 B2
(45) Date of Patent: Jul. 14, 2026

(54) ROOFING MEMBRANE HAVING A CONTROLLABLE COLOR CHANGE

(71) Applicant: SIKA TECHNOLOGY AG, Baar (CH)

(72) Inventors: Ajay Padwal, Sharon, MA (US); Blaise William Leeber, Burlington, MA (US); Xiong Jiang, Canton, MA (US); Brian Whelan, Canton, MA (US)

(73) Assignee: SIKA TECHNOLOGY AG, Baar (CH)

( * ) Notice: Subject to any disclaimer, the term of this patent is extended or adjusted under 35 U.S.C. 154(b) by 24 days.

(21) Appl. No.: 18/716,441

(22) PCT Filed: Feb. 13, 2023

(86) PCT No.: PCT/EP2023/053521
§ 371 (c)(1),
(2) Date: Jun. 4, 2024

(87) PCT Pub. No.: WO2023/152379
PCT Pub. Date: Aug. 17, 2023

(65) Prior Publication Data
US 2025/0043575 A1 Feb. 6, 2025

Related U.S. Application Data

(60) Provisional application No. 63/309,883, filed on Feb. 14, 2022.

(51) Int. Cl.
*E04D 5/10* (2006.01)
*B32B 7/12* (2006.01)
*B32B 27/06* (2006.01)

(52) U.S. Cl.
CPC .................. *E04D 5/10* (2013.01); *B32B 7/12* (2013.01); *B32B 27/06* (2013.01);
(Continued)

(58) Field of Classification Search
None
See application file for complete search history.

(56) References Cited

U.S. PATENT DOCUMENTS 9,506,243 B1 11/2016 Harris et al.
2003/0034950 A1 2/2003 Liang et al.
(Continued)

FOREIGN PATENT DOCUMENTS

EP 3938202 A1 1/2022
EP 3611308 B1 * 2/2023 ............... E04D 5/06
(Continued)

OTHER PUBLICATIONS

Apr. 25, 2023 Written Opinion issued in International Patent Application No. PCT/EP2023/053521.
(Continued)

*Primary Examiner* — Laura C Powers
(74) *Attorney, Agent, or Firm* — Oliff PLC

(57) ABSTRACT

A roofing membrane including a polymeric waterproofing layer having upper and lower major surfaces and an electronic ink display covering at least a portion of the upper major surface of the waterproofing layer. Also, a method for producing a roofing membrane and a method for covering a roof substrate using the roofing membrane.

17 Claims, 1 Drawing Sheet

(52) U.S. Cl.
CPC ... *B32B 2307/7376* (2023.05); *B32B 2419/06*
(2013.01); *B32B 2457/20* (2013.01)

(56) References Cited

U.S. PATENT DOCUMENTS

| | | |
|---|---|---|
| 2015/0234250 A1 | 8/2015 | Lin et al. |
| 2016/0076242 A1 | 3/2016 | Becker, IV et al. |
| 2016/0334690 A1 | 11/2016 | Du et al. |
| 2020/0032081 A1 | 1/2020 | Kann et al. |
| 2021/0032861 A1 | 2/2021 | Schreibfeder |
| 2022/0026775 A1 | 1/2022 | Kayal |

FOREIGN PATENT DOCUMENTS

| | | |
|---|---|---|
| JP | 2021-076870 A | 5/2021 |
| WO | 2020/182975 A1 | 9/2020 |

OTHER PUBLICATIONS

Apr. 25, 2023 Search Report issued in International Patent Application No. PCT/EP2023/053521.

\* cited by examiner

ROOFING MEMBRANE HAVING A CONTROLLABLE COLOR CHANGE

TECHNICAL FIELD

The present invention relates to the field of waterproofing of building constructions by using polymeric membranes. In particular, the present invention aims at providing roofing membranes having an upper surface, whose color can be switched according to the user requirement using an electrical control circuit.

BACKGROUND OF THE INVENTION

In the field of construction polymeric sheets, which are often referred to as membranes or panels, are used to protect underground and above ground constructions, such as basements, tunnels, and flat and low-sloped roofs, against penetration of water. Pre-fabricated roofing membranes used for waterproofing of flat and low-sloped roof structures are typically provided as single-ply or multi-ply membrane systems. In a single-ply system, the roof substrate is covered using a roofing membrane comprising a single waterproofing layer, which is typically mechanically stabilized with a reinforcement layer, such as a layer of fiber material. Roofing membranes used in multi-ply systems typically comprise at least two waterproofing layers composed of same or different materials. Commonly used materials for prefabricated single- and multi-ply roofing membranes include plastics, in particular plasticized polyvinylchloride (p-PVC), thermoplastic olefins (TPE-O, TPO), and thermoset elastomers such as ethylene-propylene diene monomer (EPDM). Liquid-applied membranes can be used as an alternative to prefabricated membranes for waterproofing of substrates. In roofing applications, the liquid-applied membranes offer easier application especially in case of complex roof geometries and for refurbishment applications.

Commonly used liquid-applied waterproofing membranes include reactive polyurethane compositions, formulated as one-part or two-part systems. The color of a pre-fabricated or liquid applied roofing membrane has a significant influence on the amount of heat energy absorbed into the membrane from the sunlight. White or light colored roofing membranes effectively reflect sunlight, which reduces the amount of heat energy absorbed into buildings they cover compared to buildings covered with black or dark colored roofing membranes. The cooling effect obtained with white roofs enables savings in operating costs and greenhouse gas emissions due to reduced need for air-conditioning. Consequently, white or light colored roofing membranes or roofing membranes having a light colored top coating are typically used in hot-climate regions. However, by the same principle, a white colored roof is undesirable during colder season due to the increased cost for heating a building that otherwise would have absorbed much more heat energy had it been covered by a traditional black colored roofing membrane. Consequently, an optimal roofing membrane would be able to undergo a change in color in response to the user requirements, in other words to have a white or light color at higher temperatures and a black or dark color at lower temperatures.

Various attempts have already been made to provide a roof covering with temperature dependent color changing abilities. Suggested solutions have typically been based on the use of thermochromic substances in the roofing membrane or in a coating applied to the top surface of the membrane. Thermochromic substances are a class of organic and inorganic compounds, which have a different color depending on the temperature. However, thermochromic substances are known to have a poor UV-stability, which is a significant disadvantage in roofing applications wherein the color changing layer should maintain its properties during long periods of intensive exposure to UV-radiation. The challenges related to the UV-sensibility of thermochromic compounds have been tried to overcome, for example, by covering the layer of color changing substances with a transparent protective coating comprising UV-light absorbers/stabilizers. In this regards, a patent application US 2016/0076242 A1 discloses a thermochromic coating, which is formed by applying a reflective, thermochromic, and protective coatings on a surface of a substrate, such as a residential or industrial building material. The protective coating comprises a resin and UV-blocking material. Another published patent application EP 3938202 A1 discloses a membrane having the thermochromic pigments incorporated in the polymeric waterproofing layer and UV-light absorbers to improve the weathering resistance of the thermochromic waterproofing layer.

Despite of the recent advances, the main disadvantage related to the poor weathering stability of the thermochromic pigments has not been satisfactorily solved. Coatings arranged to protect the thermochromic layers have to be applied in thin layers to retain their transparency to infrared ration, which makes them very susceptible to weathering. Such coatings typically wear off after couple of years of weathering in hot-climate conditions resulting in exposure of the thermochromic layer to the degrading effects of UV-radiation. On the other hand, roofing membranes typically have a thickness of at least 1 mm, which means that high amounts of the thermochromic pigments have to be used in order provide the membrane sheet with color changing ability. Such approach, even if technically feasible, is not very attractive from the cost-performance point of view. It has also been found out that the thermochromic pigments tend to lose their color changing ability despite of use relatively high amounts of stabilizing additives.

There is thus a need for a novel roofing membrane, whose color can be switched according to the user requirement. It is also desired that the color changing properties are preserved during several years of exposure to UV-radiation and other environmental conditions.

SUMMARY OF THE INVENTION

The object of the present invention is to provide a roofing membrane, which is able to change the color of its top surface according to user requirements.

The subject of the present invention is a roofing membrane as defined in claim 1.

It was surprisingly found out that a roofing membrane comprising a polymeric waterproofing layer and electronic ink display covering at least a portion of the upper major surface of the waterproofing layer is able to solve or at least mitigate the problems of the prior art membranes with color changing properties.

It was furthermore surprisingly found out that such roofing membranes can be easily produced using conventional lamination, printing, or coating techniques.

One of the advantages of the roofing membrane of the present invention is that it enables providing "a smart roof system", in which amount of heat energy, i.e., the amount electromagnetic radiation in the infrared wavelength range, absorbed into the membrane can be controlled based on the climate conditions. Consequently, the amount of operating costs and greenhouse gas emissions resulting from cooling the building during hot summer months and from heating the building during cold winter months can be effectively reduced.

Other aspects of the present invention are presented in other independent claims. Preferred aspects of the invention are presented in the dependent claims.

DETAILED DESCRIPTION OF THE INVENTION

Figure 1:
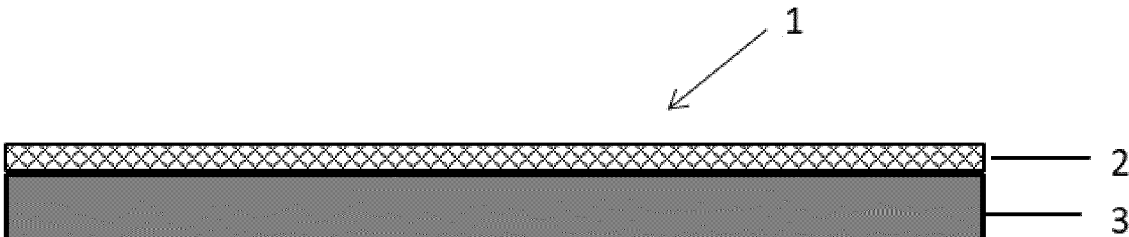
FIG. 1 shows a cross-section of a membrane (1) comprising a polymeric waterproofing layer (2) having upper and lower major surfaces and an electronic ink display (3) covering the upper major surface of the polymeric waterproofing layer (2).
Figure 2:
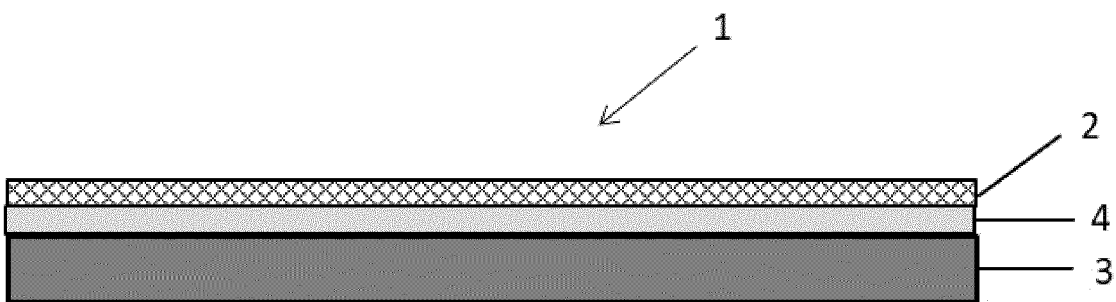
FIG. 2 shows a cross-section of a roofing membrane (1) a polymeric waterproofing layer (2) having upper and lower major surfaces and an electronic ink display (3) adhered to the upper major surface of the polymeric waterproofing layer (2) via an adhesive layer (4).

The subject of the present invention is a roofing membrane (1) comprising a polymeric waterproofing layer (2) having upper and lower major surfaces and an electrophoretic ink display (3) covering at least a portion of the upper major surface of the waterproofing layer (2).

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "elastomer" refers to any polymer or combination of polymers, which is capable of recovering from large deformations, and which can be, or already is, modified to a state in which it is essentially insoluble (but can swell) in a boiling solvent. Typical elastomers are capable of being elongated or deformed to at least 200% of their original dimension under an externally applied force, and will substantially resume the original dimensions, sustaining only small permanent set (typically no more than about 20%), after the external force is released. As used herein, the term "elastomer" may be used interchangeably with the term "rubber."

The term "softening point" refers to a temperature at which compound softens in a rubber-like state, or a temperature at which the crystalline portion within the compound melts. The softening point is preferably determined by Ring and Ball measurement conducted according to DIN EN 1238 standard.

The term "melting temperature" refers to a peak melting temperature, i.e. the temperature at which a material undergoes transition from the solid to the liquid state. The melting temperature is preferably by differential scanning calorimetry (DSC) according to ISO 11357 standard using a heating rate of 2° C./min. The measurements can be performed with a Mettler Toledo DSC 3+ device and the Tg values can be determined from the measured DSC-curve with the help of the DSC-software. The term "melting point" may be used interchangeably with the term "melting temperature".

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using an applied frequency of 1 Hz and a strain level of 0.1%.

The "amount or content of at least one component X" in a composition, for example "the amount of the at least one thermoplastic polymer" refers to the sum of the individual amounts of all thermoplastic polymers contained in the composition. Furthermore, in case the composition comprises 20 wt.-% of at least one thermoplastic polymer, the sum of the amounts of all thermoplastic polymers contained in the composition equals 20 wt.-%.

The term "room temperature" designates a temperature of 23° C.

The roofing membrane and the electronic ink display are preferably sheet-like elements composed of one or more individual layers and having upper and lower major surfaces, i.e., primary exterior surfaces, and a thickness defined therebetween. The term "sheet-like element" refers in the present disclosure to elements having a length and width at least 10 times, preferably at least 15 times, more preferably at least 25 times greater than the thickness of the element.

The electronic ink display covering at least a portion of the upper major surface of the roofing membrane is preferably selected from electrophoretic, electrowetting, or electrofluidic displays.

Electrophoretic, electrowetting, and electrofluidic displays are examples of flexible displays that mimic the appearance of ordinary ink on paper, also known as "electronic paper". The inherent advantage of this type of display technology is that the display can hold static text and images indefinitely without electricity. Another important advantage is that the electronic ink displays are passively lit, since they utilize the refection of ambient light, which makes them particularly suitable for outdoor applications. The basic structure of flexible electronic ink display comprises plastic substrates and plastic electronics for the display backplane.

An electrophoretic display (EPD) typically comprises an electrophoretic medium comprising charged light and dark colored pigment particles dispersed in a liquid, which is sandwiched between conductive plates (electrodes) separated by a gap of 10-100 μm. Carbon black has been often used as a black pigment whereas titan dioxide is a typical white pigment for electrophoretic displays. When a voltage is applied across the two plates, the particles migrate electrophoretically to the plate that bears the opposite charge from that on the particles. When the pigment particles are located at the front (viewing) side of the display, it appears white, because the light is scattered back to the viewer by the high-index light colored particles. When the light colored particles are located at the rear (non-viewing) side of the display, it appears dark, because the incident light is absorbed by the dark colored particles. By manipulating the electrical field properly, the ratio of black and white particles on the viewing surface of the display can be controlled forming a desired gray scale color.

Electrowetting display (EWD) is based on controlling the shape of a confined water/oil interface by an applied voltage. With no voltage applied, the (colored) oil forms a flat film between the water and a hydrophobic (water-repellent) insulating coating of an electrode, resulting in a colored pixel. When a voltage is applied between the electrode and the water, the interfacial tension between the water and the coating changes. As a result, the stacked state is no longer stable, causing the water to move the oil aside. This makes a partly transparent pixel, or, if a reflective white surface is under the switchable element, a white pixel. Because of the small pixel size, the user only experiences the average reflection, which provides a high-brightness, high-contrast switchable element.

Electrofluidic display (EFD) is a variation of an electrowetting display. Electrofluidic displays place an aqueous pigment dispersion inside a tiny reservoir. The reservoir comprises <5-10% of the viewable pixel area and therefore the pigment is substantially hidden from view. Voltage is used to electromechanically pull the pigment out of the reservoir and spread it as a film directly behind the viewing substrate. When voltage is removed liquid surface tension causes the pigment dispersion to rapidly recoil into the reservoir.

Preferably, the electronic ink display covers at least 5%, preferably at least 15%, more preferably at least 35%, even more preferably at least 50%, still more preferably at least 75%, particularly at least 90%, of the total area of the upper major surface of the polymeric waterproofing layer.

According to one or more embodiments, the electronic ink display covers at least 65%, preferably at least 75%, more preferably at least 85%, even more preferably at least 90%, of the total area of the upper major surface of the polymeric waterproofing layer.

It may however be preferred that narrow segments on the upper major surface of the polymeric waterproofing layer limited by the short and/or long edges of the waterproofing layer are not covered with the electronic ink display. Providing such selvedges on the short and/or long edges of the polymeric waterproofing layer enables bonding of the overlapped portions of adjacent roofing membranes using heat-welding. The width of the selvedges, i.e., the distance that the roofing membrane extends beyond a short or long side edge of the electronic ink display, can be at least 5 mm, preferably at least 15 mm, more preferably at least 25 mm and not more than 500 mm, preferably not more than 400 mm, more preferably not more than 300 mm.

According to one or more embodiments, the electronic ink display is an electrophoretic display comprising:

A first surface on a viewing side and a second surface of a non-viewing side

A first light-transmissive electrode layer at the viewing side,

A backplane comprising a second electrode layer, and

An electrophoretic material layer comprising an electrophoretic medium sandwiched between the first light-transmissive electrode layer and the backplane.

The term "viewing side" refers in the context of the present invention to the side at which images of the display are viewed. It goes without saying that the electrophoretic display has been arranged to the upper major surface of the polymeric waterproofing layer in such a way that the first surface of the electrophoretic display on the viewing side faces away from the upper major surface of the polymeric waterproofing layer (2).

The electrophoretic display and the polymeric waterproofing layer are preferably directly or indirectly connected to each other over at least a portion of their opposing surfaces.

The expression "directly connected" is understood to mean in the context of the present invention that no further layer or substance is present between the layers, and that the opposing surfaces of the layers are directly bonded to each other or adhere to each other. At the transition area between the two layers, the materials of the layers can also be present mixed with each other. On the other hand, the electrophoretic display and the polymeric waterproofing layer can be indirectly connected to each other, for example, via a connecting layer, such as an adhesive layer or a layer of fiber material, or a combination thereof. In case a porous connecting layer, such as an open weave fabric, the layers may be partially directly connected and partially indirectly connected to each other.

According to one or more embodiments, the second surface of the electrophoretic display is thermally, mechanically, or adhesively adhered, preferably adhesively or mechanically adhered, more preferably adhesively adhered to at least a portion of the upper major surface of the polymeric waterproofing layer.

Suitable adhesive for use in adhering the electrophoretic display include, for example, reactive one- and two-component epoxy and polyurethane adhesives, water and solvent-based contact adhesives, pressure sensitive adhesives, hot-melt adhesives, and foamed adhesives.

Suitable mechanical adhering means include, for example, hook and loop fasteners. The term "hook and loop fastener" refers here to mechanical fastening devices comprising two portions, a first component, such as a hook component, and a second complimentary component, such as a loop component, which are releasable interconnected when brought into contact with each other. A hook and loop fastener can be provided in a hook- and loop configuration or in a hook- and hook configuration. Suitable hook and loop fasteners are commercially available, for example, under the trademark of Velcro® Brand (from Velcro BVBA) and under the trademark of 3M® Hook and Loop Fastener (from 3M).

The expression "thermally adhered" is understood to mean that the layers have been bonded to each other without using an adhesive by applying sufficient amount of heat to at least one of the layers to at least partially melt the composition forming the respective layer(s) followed by contacting the opposing surfaces of the layers with each other, preferably under the influence of pressure, and cooling the layers to effect "thermal bonding".

The first light-transmissive electrode layer of the electrophoretic display is preferably a metal layer or a conductive polymer layer, more preferably an aluminum or an indium tin oxide layer or polyethylene terephthalate layer coated with aluminum or indium tin oxide.

The second electrode layer of the electrophoretic display preferably comprises an array of pixel electrodes. Suitable pixel electrodes are described, for example, in US patent application US 2003/0034950 A1, the content of which is incorporated herein by reference in its entirety. Although it may be possible or even preferred to use an active matrix driving with a thin film transistor (TFT) for second electrode layer comprising the pixel electrodes, other types of electrodes can also be used. Preferably, the electrophoretic display further comprises an appropriate arrangement of semiconductors to connect the pixel electrodes to a drive circuitry.

The electrophoretic medium that is located between the first light-transmissive electrode layer and the backplane preferably comprises electrophoretic particles in a liquid, preferably a non-polar liquid. The liquid may also be a solvent or solvent mixture. Furthermore, the electrophoretic medium is preferably compartmented in display cells. Suitable display cells include, for example, microcells, microcapsules, and microchannels.

According to one or more embodiments, the electrophoretic display further comprises a protective polymeric sheet covering at least a portion of the upper surface of the first light-transmissive electrode layer. Suitable materials for the protective polymeric sheet include at least polystyrene.

It may also be advantageous that the electrophoretic display further comprises a conductive edge seal, which electrically connects the first light-transmissive electrode layer to the second electrode layer. The conductive edge seal is not only used for connecting the first and second electrodes but also to prevent ingress of moisture into the display.

Suitable electrophoretic displays and methods for producing these are disclosed, for example, in patent applications US 2015/0234250 A1, US 2016/334690 A1, and US 2022/0026775 A1, the content of which is incorporated herein by reference in their entirety.

The roofing membrane comprises, in addition to the electronic ink display, a polymeric waterproofing membrane. The term "polymeric layer" refers to layers comprising one or more polymers. Furthermore, the term "waterproofing layer" refers to continuous layers that are capable of acting as a barrier against penetration of water or other liquids. Preferably, the polymeric waterproofing layer exhibits a water resistance measured according to EN 1928 B standard of 0.6 bar for 24 hours.

According to one or more preferred embodiments, the polymeric waterproofing layer comprises at least one polymer selected from polyolefins, halogenated polyolefins, polyvinylchloride (PVC), rubbers, and ketone ethylene esters.

According to one or more embodiments, the polymeric waterproofing layer comprises at least 25 wt.-%, preferably at least 35 wt.-%, more preferably at least 50 wt.-%, even more preferably at least 65 wt.-%, based on the total weight of the polymeric waterproofing layer, of the at least one polymer.

Suitable polyvinyl chloride resins include those produced by suspension polymerization (also referred to as S-PVC) as well as those produced by emulsion polymerization (also referred to as E-PVC). Especially suitable PVC resins for use as the at least one polymer include ones having a K-value determined by using the method as described in ISO 1628-2-1998 standard in the range of 50-85, preferably 65-75. The K-value is a measure of the polymerization grade of the PVC-resin and it is determined from the viscosity values of the PVC homopolymer as virgin resin, dissolved in cyclohexanone at 30° C.

Term "polyolefin" refers in the present disclosure to homopolymers and copolymers obtained by polymerization of olefins optionally with other types of comonomers. Suitable polyolefins for use as the at least one polymer include, for example, thermoplastic elastomers (TPE) and thermoplastic polyolefin elastomers (TPE-O).

Particularly suitable polyolefins include propylene homopolymers, for example, isotactic polypropylene (iPP), syndiotactic polypropylene (sPP), and homopolymer polypropylene (hPP), and propylene copolymers, particularly propylene-α-olefin copolymers.

Suitable propylene-α-olefin copolymers include random and block copolymers of propylene with ethylene and/or with one or more $C_4$-$C_{20}$ α-olefin monomers, particularly one or more of 1-butene, 1-pentene, 1-hexene, 1-heptene, 1-octene, 1-decene, 1-dodecene, and 1-hexadodecene, preferably comprising at least 55 wt.-%, more preferably at least 65 wt.-%, of propylene-derived units, based on the weight of the copolymer.

Especially suitable propylene-ethylene copolymers include the propylene-ethylene copolymers, which are commonly characterized as "propylene-based elastomers". These types of propylene-ethylene copolymers are commercially available, for example, under the trade name of Versify® (from Dow Chemicals) and under the trade name of Vistamaxx® (from Exxon Mobil).

Further suitable polyolefins include heterophasic propylene copolymers. These are heterophasic polymer systems comprising a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier. Suitable commercially available heterophasic propylene copolymers include reactor blends of the base polyolefin and the polyolefin modifier, also known as "in-situ TPOs" or "reactor TPOs or "impact copolymers (ICP)", which are typically produced in a sequential polymerization process, wherein the components of the matrix phase are produced in a first reactor and transferred to a second reactor, where the components of the dispersed phase are produced and incorporated as domains in the matrix phase. Heterophasic propylene copolymers comprising polypropylene homopolymer as the base polymer are often referred to as "heterophasic propylene copolymers (HECO)" whereas heterophasic propylene copolymers comprising polypropylene random copolymer as the base polymer are often referred to as "heterophasic propylene random copolymers (RAHECO)". The term "heterophasic propylene copolymer" encompasses in the present disclosure both the HECO and RAHECO types of the heterophasic propylene copolymers.

Suitable rubbers for use as the at least one polymer include, for example, styrene-butadiene rubber (SBR), ethylene propylene diene monomer (EPDM), butyl rubber, polyisoprene, polybutadiene, natural rubber, polychloroprene rubber, ethylene-propylene rubber (EPR), nitrile rubber, acrylic rubber, ethylene vinyl acetate rubber, and silicone rubber, and chemically crosslinked versions of the aforementioned rubbers.

The term "EPDM" refers in the present disclosure to terpolymer of ethylene, propylene, and a non-conjugated diene. Non-limiting examples of suitable non-conjugated dienes to be used in EPDM include, for example, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,4-cyclohexadiene; tetrahydroindene; methyltetrahydroindene; dicyclopentadiene; 5-isopropylidene-2-norbornene; and 5-vinyl-norbornene.

According to one or more embodiments, the polymeric waterproofing layer is a PVC-based waterproofing layer comprising:
- a1) 25-80 wt.-%, preferably 25-70 wt.-%, of a polyvinylchloride resin,
- a2) 10-55 wt.-%, preferably 15-45 wt.-%, of at least one plasticizer, and
- a3) 2.5-55 wt.-%, preferably 5-45 wt.-%, of at least one inorganic filler, all proportions being based on the total weight of the PVC-based waterproofing layer.

Suitable plasticizers include but are not restricted to, linear or branched phthalates such as di-isononyl phthalate (DINP), di-nonyl phthalate (L9P), diallyl phthalate (DAP), di-2-ethylhexyl-phthalate (DEHP), dioctyl phthalate (DOP), diisodecyl phthalate (DIDP), and mixed linear phthalates (911P). Other suitable plasticizers include phthalate-free plasticizers, such as trimellitate plasticizers, adipic polyesters, and biochemical plasticizers. Examples of biochemical plasticizers include epoxidized vegetable oils, for example, epoxidized soybean oil and epoxidized linseed oil and acetylated waxes and oils derived from plants, for example, acetylated castor wax and acetylated castor oil.

According to one or more embodiments, the at least one plasticizer is selected from the group consisting of phthalates, trimellitate plasticizers, adipic polyesters, and biochemical plasticizers.

Preferably the at least one inorganic filler is selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

According to one or more embodiments, the polymeric waterproofing layer is a TPO-based waterproofing layer comprising:

b1) At least 65 wt.-%, preferably at least 75 wt.-%, of at least one polyolefin and b2) 0.5-35 wt.-%, preferably 1-25 wt.-%, of the at least one inorganic filler, all proportions being based on the total weight of the TPO-based waterproofing layer.

The at least one inert mineral filler is preferably present in the polymeric waterproofing layer in form of finely divided particles, preferably having a median particle size $d_{50}$ of not more than 50 μm, more preferably not more than 25 μm, even more preferably not more than 10 μm.

The PVC- and TPO-based waterproofing layers can further comprise one or more additives, for example, UV- and heat stabilizers, UV-absorbers, antioxidants, flame retardants, dyes, pigments such as titanium dioxide and carbon black, matting agents, antistatic agents, impact modifiers, biocides, and processing aids such as lubricants, slip agents, antiblock agents, and denest aids.

According to one or more embodiments, the roofing membrane further comprises a reinforcing layer at least partially embedded into the polymeric waterproofing layer (2) or adhered to least a portion of the lower major surface of the polymeric waterproofing layer (2). By the expression "fully embedded" is meant that the reinforcement layer is fully covered by the matrix of the polymeric waterproofing layer.

A reinforcing layer can be included into the roofing membrane to ensure the mechanical stability of the polymeric waterproofing layer when the roofing membrane is exposed to varying environmental conditions, in particular to large temperature fluctuations.

The type of the reinforcement layer, if used, is not particularly restricted. For example, the reinforcement layers commonly used for improving the dimensional stability of thermoplastic roofing membranes can be used. Preferred reinforcement layers comprise at least one layer of fiber material.

The term "fiber material" designates in the present document materials composed of fibers comprising or consisting of, for example, organic, inorganic or synthetic organic materials. Examples of organic fibers include, for example, cellulose fibers, cotton fibers, and protein fibers. Particularly suitable synthetic organic materials include, for example, polyester, homopolymers and copolymers of ethylene and/or propylene, viscose, nylon, and polyamides. Fiber materials composed of inorganic fibers are also suitable, in particular, those composed of metal fibers or mineral fibers, such as glass fibers, aramid fibers, wollastonite fibers, and carbon fibers. Inorganic fibers, which have been surface treated, for example, with silanes, may also be suitable. The fiber material can comprise short fibers, long fibers, spun fibers (yarns), or filaments. The fibers can be aligned or drawn fibers. It may also be advantageous that the fiber material is composed of different types of fibers, both in terms of geometry and composition.

Preferably, the reinforcement layer is selected from the group consisting of non-woven fabrics, woven fabrics, and laid scrims.

The term "non-woven fabric" designates in the present disclosure materials composed of fibers, which are bonded together by using chemical, mechanical, or thermal bonding means, and which are neither woven nor knitted. Non-woven fabrics can be produced, for example, by using a carding or needle punching process, in in which the fibers are mechanically entangled to obtain the non-woven fiber web or by using a spun bonding process. In chemical bonding, chemical binders such as adhesive materials are used to hold the fibers together in a non-woven fiber web.

The term "laid scrim" refers in the present disclosure web-like non-woven products composed of at least two sets of parallel yarns (also designated as weft and warp yarns), which lay on top of each other and are chemically bonded to each other. The yarns of a non-woven scrim are typically arranged with an angle of 60-120°, such as 90±5°, towards each other thereby forming interstices, wherein the interstices occupy more than 60% of the entire surface area of the laid scrim. Typical materials for laid scrims include metal fibers, inorganic fibers, in particular glass fibers, and synthetic organic fibers, in particular polyester, polypropylene, polyethylene, and polyethylene terephthalate (PET).

According to one or more embodiments, the reinforcement layer is a non-woven fabric composed of synthetic organic fibers or inorganic fibers, wherein the synthetic organic fibers are preferably selected from the group consisting of polyester fibers, polypropylene fibers, polyethylene fibers, nylon fibers, and polyamide fibers and wherein the inorganic fibers are selected from the group consisting of glass fibers, aramid fibers, wollastonite fibers, and carbon fibers and wherein the non-woven fabric preferably has a mass per unit weight of not more than 350 g/m², more preferably not more than 300 g/m², even more preferably not more than 250 g/m², such as in the range of 10-350 g/m², preferably 25-250 g/m². The mass per unit area of a non-woven fabric can be determined by measuring the mass of test piece of the non-woven fabric having a given area and dividing the measured mass by the area of the test piece. Preferably, the mass per unit area of a non-woven fabric is determined as defined in ISO 9073-18:2007 standard.

According to one or more further embodiments, the reinforcement layer is a laid scrim, preferably composed of synthetic organic fibers or glass fibers, wherein the synthetic organic fibers are preferably selected from the group consisting of polyester fibers, polypropylene fibers, polyethylene fibers, and polyethylene terephthalate (PET) fibers, more preferably polyester fibers and wherein the laid scrim preferably has a mass per unit weight of not more than 350 g/m², more preferably not more than 300 g/m², even more preferably not more than 250 g/m², such as in the range of 10-350 g/m², preferably 25-250 g/m².

According to one or more embodiments, the polymeric waterproofing layer has a thickness of 0.1-3.5 mm, preferably 0.5-2.5 mm and/or a width of 0.5-5 m, preferably 1-3 m. The term "width" and "length" refer to the two perpendicular dimensions measured in the horizontal plane of the upper and lower major surfaces of a sheet-like element. Generally, the "width" of a sheet-like element is the smaller of the horizontal dimensions. Consequently, the "width" of a sheet of the protective layer refers to the minor dimension measured in the horizontal plane of the sheet in a direction perpendicular to the length of the sheet.

According to one or more embodiments, the roofing membrane comprises a further polymeric waterproofing layer on the side opposite to the side of the electronic ink display. The polymeric waterproofing layer and the further polymeric waterproofing layer are preferably directly connected to each other over at least a portion of their opposing major surfaces.

According to one or more embodiments, the roofing membrane a pre-fabricated membrane. Such pre-fabricated roofing membranes are typically provided in form of a roll, which is delivered to the construction site and unwound to provide sheets having a length of several times the width. However, the roofing membrane can also be provided in the form of narrow strips, typically having a width of not more than 0.75 m, preferably not more than 0.5 m. Such strips of the roofing membrane can be used, for example, for roof detailing purposed or as flashing membranes for parapets. Furthermore, the roofing membrane can also be provided in the form of planar bodies, which are used for repairing damaged locations in existing roofing systems.

The preferences given above for the polymeric waterproofing layer, the electronic ink display, and the reinforcing layer apply equally to all subjects of the present invention unless otherwise stated.

Another subject of the present invention is a method for producing a roofing membrane of the present invention, the method comprising steps of:

I) Providing a polymeric waterproofing layer (2) having upper and lower major surfaces and II) Applying an electric ink display on the upper major surface of the roofing membrane.

Step I) of the method can be conducted by using any conventional means for producing polymeric sheets, such as extruding or co-extruding a melt-processed composition comprising the constituents of the polymeric waterproofing layer through an extruder die followed by cooling of the extruded shaped melt between a pair of calender cooling rolls.

Step II) of the method can be conducted by using thermal or adhesive lamination, mechanical attachment, printing, or coating techniques.

Suitable coating techniques for use in step II) include at least patch die coating, slot or extrusion coating, slide or cascade coating, curtain coating, roll coating, gravure coating, dip coating, spray coating, meniscus coating, spin coating, brush coating, and air knife coating and suitable printing techniques include at least silk screen printing process, electrostatic printing process, thermal printing process, ink jet printing processes, and electrophoretic deposition techniques.

According to one or more embodiments, step II) comprises thermally or adhesively laminating or mechanically attaching, preferably adhesively laminating or mechanically attaching, more preferably adhesively laminating the electric ink display to the upper major surface of the polymeric waterproofing layer in a manner that gives direct bonding between the electric ink display and the upper major surface of the polymeric waterproofing layer.

According to one or more embodiments, the electric ink display is selected from electrophoretic, electrowetting, and electrofluidic displays. According to one or more embodiments, the electric ink display is an electrophoretic display.

Still another subject of the present invention is a method for covering a roof substrate, the method comprising steps of:

I. Applying two or more sheets of the roofing membrane of the present invention on surface of the roof substrate to be covered, II. Overlapping adjacent sheets of the roofing membrane along the length and/or width of the sheets, and III. Bonding the opposing surfaces of the overlapped portions of the adjacent sheets to each other to provide acceptable seam strength by using heat-welding or by adhesive bonding.

According to one or more embodiments, the roof substrate is selected from the group consisting of an insulation board, a cover board, and an existing roofing membrane.

Suitable insulation boards comprise at least one foam panel having a closed cell structure. Suitable foam panels having a closed cell structure include molded expanded polystyrene (EPS) foam panels, extruded expanded polystyrene (XPS) foam panels, polyurethane foam panels (PUR), and polyisocyanurate (PIR) foam panels.

Suitable cover boards include, for example, gypsum boards, fiber-reinforce gypsum boards, wood fiber boards, cementitious boards, high-density (compressed) polyisocyanurate boards, perlite boards, asphaltic boards, mineral fiber boards, and plywood or oriented strand boards.

The invention claimed is:

1. A roofing membrane comprising a polymeric waterproofing layer having upper and lower major surfaces and an electronic ink display covering at least a portion of the upper major surface of the polymeric waterproofing layer, wherein the polymeric waterproofing layer exhibits a water resistance measured according to EN 1928 B standard of 0.6 bar for 24 hours and wherein the electronic ink display is selected from electrophoretic, electrowetting, and electrofluidic displays.

2. The roofing membrane according to claim 1, wherein the electronic ink display covers at least 15% of a total area of the upper major surface of the polymeric waterproofing layer.

3. The roofing membrane according to claim 1, wherein a second surface of electric ink display has been thermally, mechanically, or adhesively adhered to at least a portion of the upper major surface of the polymeric waterproofing layer.

4. The roofing membrane according to claim 1, wherein the electronic ink display is an electrophoretic display comprising:

a first surface on a viewing side and a second surface of a non-viewing side a first light-transmissive electrode layer at the viewing side, a backplane comprising a second electrode layer, and an electrophoretic material layer comprising an electrophoretic medium sandwiched between the first light-transmissive electrode layer and the backplane.

5. The roofing membrane according to claim 4, wherein the first surface of the electrophoretic display faces away from the upper major surface of the polymeric waterproofing layer.

6. The roofing membrane according to claim 4, wherein the first light-transmissive electrode layer is a metal layer or a conductive polymer layer.

7. The roofing membrane according to claim 4, wherein the second electrode layer comprises an array of pixel electrodes.

8. The roofing membrane according to claim 4, wherein the electrophoretic medium is compartmented in display cells.

9. The roofing membrane according to claim 4, wherein the electrophoretic display further comprises a protective polymeric sheet covering at least a portion of an upper surface of the first light-transmissive electrode layer.

10. The roofing membrane according to claim 4, wherein the electrophoretic display further comprises a conductive edge seal, which electrically connects the first light-transmissive electrode layer to the second electrode layer.

11. The roofing membrane according to claim 1, wherein the polymeric waterproofing layer comprises at least one polymer selected from polyolefins, halogenated polyolefins, polyvinylchloride, rubbers, and ketone ethylene esters.

12. The roofing membrane according to claim 1 further comprising a reinforcing layer at least partially embedded into the polymeric waterproofing layer or adhered to at least a portion of the lower major surface of the polymeric waterproofing layer.

13. The membrane roofing according to claim 12 wherein the reinforcing layer is a layer of fiber material.

14. The roofing membrane according to claim 1, wherein the polymeric waterproofing layer has a thickness of 0.1-3.5 mm and/or a width of 0.5-5 m.

15. A method for producing a roofing membrane according to claim 1, the method comprising steps of:

I) providing a polymeric waterproofing layer having upper and lower major surfaces and II) applying an electronic ink display on the upper major surface of the polymeric waterproofing layer, wherein the electronic ink display is selected from electrophoretic, electrowetting and electrofluidic displays.

16. The method according to claim 15, wherein step II) is conducted by using thermal or adhesive lamination, mechanical attachment, printing, or coating techniques.

17. A method for covering a roof substrate, the method comprising steps of:

I. applying two or more sheets of the roofing membrane according to claim 1 on surface of the substrate to be covered, II. overlapping adjacent sheets of the roofing membrane along length and/or width of the sheets, and III. bonding opposing surfaces of overlapped portions of the adjacent sheets to each other to provide acceptable seam strength by using heat-welding or by adhesive bonding.

* * * * *